(12) United States Patent
Menez et al.

(10) Patent No.: US 8,218,239 B2
(45) Date of Patent: Jul. 10, 2012

(54) LIGHT-DIFFUSING GRATING

(75) Inventors: Ludivine Menez, Paris (FR);
Jean-Philippe Mulet, Ozoir-la-Ferriere (FR); Philippe Lalanne, Palaiseau (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/598,603

(22) PCT Filed: Apr. 16, 2008

(86) PCT No.: PCT/FR2008/050677
§ 371 (c)(1),
(2), (4) Date: Dec. 17, 2009

(87) PCT Pub. No.: WO2008/145895
PCT Pub. Date: Dec. 4, 2008

(65) Prior Publication Data
US 2010/0128349 A1    May 27, 2010

(30) Foreign Application Priority Data
May 4, 2007   (FR) ..................... 07 54877

(51) Int. Cl.
*G02B 5/18* (2006.01)
(52) U.S. Cl. ........ 359/592; 359/591; 359/576; 359/569; 359/571; 359/573
(58) Field of Classification Search ............... 350/162.2, 350/162.12–162.13, 162.16, 162.17–162.18, 350/162.23, 258, 276–277, 311, 370; 355/1; 359/162.11, 204.1, 204.5, 211.6, 398, 558, 359/563, 566, 569, 571
See application file for complete search history.

(56) References Cited

U.S. PATENT DOCUMENTS 4,502,756 A * 3/1985 Peterson et al. ............. 359/572
5,009,484 A * 4/1991 Gerritsen ..................... 359/569
(Continued)

FOREIGN PATENT DOCUMENTS
JP          59 099219          6/1984
(Continued)

OTHER PUBLICATIONS

Variation of blaze of concave diffraction gratings M.C. Hutley and W.R. Hunter Applied Optics, vol. 20, No. 2, Jan. 15, 1981.*

*Primary Examiner* — Clayton E Laballe
*Assistant Examiner* — Kevin Butler
(74) *Attorney, Agent, or Firm* — Oblon, Spivak, McClelland, Maier & Neustadt, L.L.P.

(57) ABSTRACT

The invention relates to a transparent substrate comprising at its surface a grating of lines of at least 200 light-diffusing elements, said elements being separated by domains with a different refractive index from that of the elements, the distance d between centers of gravity of neighboring elements varying in a non-monotonic manner from one edge of the grating to the other, so that for any group of 50 successive elements, the distance d between the centers of gravity of neighboring elements of said group is at least once greater than and at least once less than the mean distance dm of distances d between centers of gravity of neighboring elements of said group, dm lying between 75 nm and 200 µm. This substrate is transparent in direct vision and redirects the light while diffusing it without iridescence in a daylighting application.

27 Claims, 3 Drawing Sheets

U.S. PATENT DOCUMENTS

Figure 1:
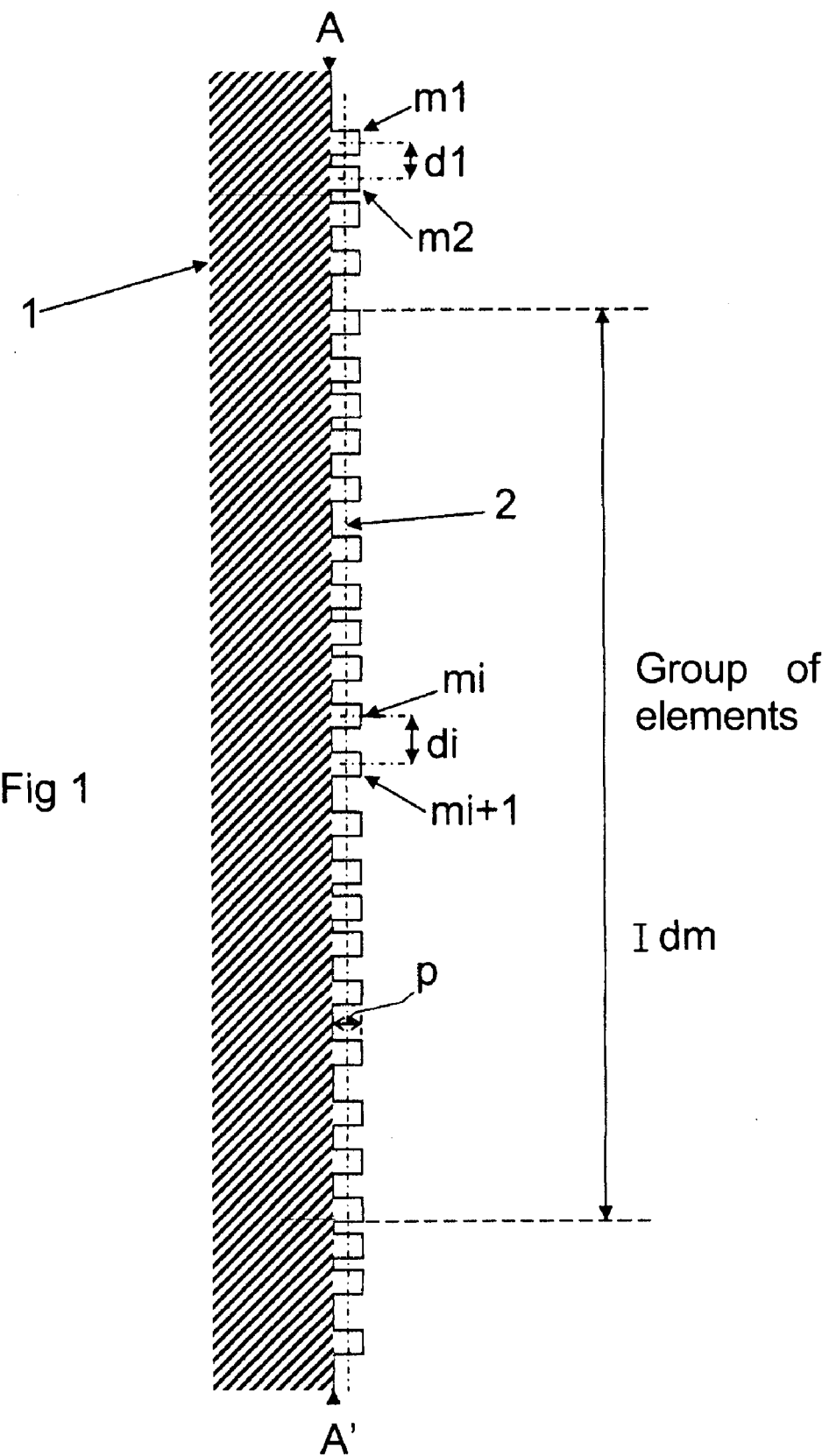

| | | |
|---|---|---|
| 6,020,944 A * | 2/2000 | Hoshi ............................... 349/62 |
| 6,094,306 A | 7/2000 | Jain |
| 6,583,932 B1 * | 6/2003 | George et al. ................. 359/566 |
| 7,352,931 B1 * | 4/2008 | Painchaud et al. ............... 385/37 |
| 7,454,103 B2 * | 11/2008 | Parriaux .......................... 385/37 |
| 2004/0136038 A1 * | 7/2004 | Holmes et al. .................. 359/15 |
| 2004/0212890 A1 * | 10/2004 | Shiozaki et al. .............. 359/563 |
| 2004/0264858 A1 * | 12/2004 | Rothenberg .................... 385/37 |
| 2005/0275944 A1 * | 12/2005 | Wang et al. .................... 359/576 |
| 2007/0031140 A1 * | 2/2007 | Biernath et al. .............. 396/268 |
| 2007/0217742 A1 * | 9/2007 | Reid et al. ........................ 385/37 |

FOREIGN PATENT DOCUMENTS

| | | |
|---|---|---|
| WO | 2004 008190 | 1/2004 |
| WO | 2006 014408 | 2/2006 |

* cited by examiner

LIGHT-DIFFUSING GRATING

The present application is the U.S. counterpart of WO 2008/145895, the text of which is incorporated by reference and claims the priority of the French application No. 0754877 filed on May 4, 2007, the text of which is incorporated by reference.

The invention relates to the field of glazing for buildings comprising elements capable of redirecting light, coming from outside, in a desired direction to the inside, generally the ceiling. This type of glazing is generally qualified as "daylighting" when it is visible solar light that is to be deflected.

This type of glazing is generally considered as contributing to energy savings on account of the fact that external light is used more efficiently inside, which makes it possible to reduce artificial lighting.

U.S. Pat. No. 5,009,484 teaches an item of glazing comprising a diffraction grating consisting of parallel lines in relief. This document teaches that the grating usually leads to diffraction of light resulting in a separation of colors. This effect is not necessarily desired. In order to limit the extent of this phenomenon, the same document recommends (see its FIG. 3) juxtaposing three basic colors vertically, so that the emerging beams of the three colors should blend once again on the ceiling to reform a colorless illuminated zone. The three successive gratings have different periodicities, varying in a monotonic manner and according to a precise order. This document also teaches that the three successive gratings may be replaced by a single grating of which periodicity changes in a monotonic manner from one of the ends of this single grating to the other. The solutions taught by this patent work to some extent but do not prevent any iridescence forming. Moreover, in this document, the fusing elements are slanted, possibly variable, and have a variable depth, which makes industrial manufacture very difficult over a large area and with low costs.

The present invention relates to a surface grating limiting the apparent separation of the various colors of light and leading to illumination with substantially the same coloration as the incident light, without pronounced apparent iridescence of the deflected light (generally on the ceiling). Thus, if the incident light is substantially colorless to the naked eye, so is the emergent light. It is desirable that the deflected light is also colorless according to a single order of the grating (general order 1 of the grating) since if not this would produce various separate illuminating zones (on the ceiling if the light is projected to the ceiling) some of which would not be judicially placed and moreover, this could be unaesthetic.

According to the invention, there is created on the surface of a transparent substrate and in a direction parallel to said surface, a grating comprising an alternation of at least two refractive indices R1 and R2 by linear elementary elements of index R1 separated by linear elementary domains of index R2, said elements and domains being geometrically complementary to each other. The elements and domains are complementary geometrically since they fit into each other. This is why only the definition of the geometry of the elements of index R1 is sufficient, since the domains with index R2 fill all the space situated between the elements. The geometry of the elements is defined by their barycenter, by their width L in the plane parallel to the substrate, by the distance d of one barycenter to the other between neighboring elements and by their depth p.

The substrate according to the invention may even be transparent, which means that it is then possible to see clearly through it without objects appearing diffuse or distorted, and this whatever the angle of vision for the observer. This transparency in direct vision is all the better if the width of the elements remains substantially constant all along the grating. The grating of lines according to the invention thus only has a diffusing effect for redirected light. The transparent substrate bearing a grating redirects a portion of the incident light in the desired direction (order 1 of the grating), for example the ceiling. At the same time, it allows the remainder of the incident light to pass without deflecting it (order 0 of the grating). The transparent substrate according to the invention comprises a grating diffusing light redirected so that this light does not have any apparent pronounced iridescence. Transmission in order (redirected light) does not occur in a single direction but over a wide range of angles. On the contrary, and if the width L of elements is substantially constant, the light transmitted without being redirected is not diffused. Thus, transmission in order 0 occurs in the same direction as the incident light ray. The substrate according to the invention is thus transparent and non-diffusing in direct vision for an observer.

Part of the light is redirected (that is to say deflected) whatever its angle of incidence. The grating diffuses light that it deflects. If the angle of incidence of the light is defined as being the angle between the perpendicular to the substrate and the direction of the light (which corresponds to the angle $\theta$ indicated in FIG. 2), the redirected light is 10 to 50% of the total transmitted light (passing through the substrate), in particular for light with an angle of incidence greater than 30°. Thus, the invention exhibits greater usefulness for equipping glazing (positioned vertically) in premises situated in terrestrial latitudes such that the sun's rays can form an angle of incidence with the horizontal greater than 30°, at least partially during the year.

According to the invention, the distance d between centers of gravity of neighboring elements varies in a non-monotonic manner from one edge of the grating to the other. The term "monotonic" signifies that this distance does not only increase or decrease when one passes from one edge of the grating to the other. On the other hand, this distance d alternates from greater values to smaller values when passing from one edge of the grating to the other.

Thus the invention relates first of all to a substrate that can be transparent in direct vision, comprising at its surface a grating of lines of at least 200 elements, said elements being separated by domains with a different refractive index from that of the elements, the distance d between centers of gravity of neighboring elements varying in a non-monotonic manner from one edge of the grating to the other, so that for any group of 50 successive elements, or even any group of 20 successive elements, the distance d between the centers of gravity of neighboring elements of said group is at least once greater than and at least once less than the mean distance dm of distances d between centers of gravity of neighboring elements of said group, dm lying between 75 nm and 200 μm. Thus, whatever the group of 50 successive elements, or even of 20 successive elements, that are chosen on the grating, it may be found that the distance d is not constant within this group.

Preferably, in the grating according to the invention, identical juxtaposed elements form blocks of 3 to 15 elements and preferably 3 to 7 elements. A block is therefore characterized by an identical distance between elements, from barycenter to barycenter. Starting from the interior of a block, as soon as the distance between elements changes, this is when the block is left. It is possible to pass from one block to another directly, so that the element at the junction of two blocks forms part of two blocks. However, the distance between two blocks may also be different from the distance between elements of one or other of these blocks. In this case, there is no element that belongs to two blocks at the same time. Preferably, at least 80% and even at least 90% of the elements of the grating form part of blocks. A block comprises a minimum of three elements and two identical intervals between these three elements. A block of n elements contains n−1 intervals. If we say that at least 80% of the elements of the grating form part of blocks with 3 to 15 elements, this means that it is possible for isolated blocks of more than 15 elements to be located here or there within the grating. If an "isolated block" of more than 15 elements contains more than 20 elements, this is compatible with the notion according to which, for any group of 50 successive elements, the distance d between centers of gravity of neighboring elements of said group is at least once greater and at least once less than the mean distance dm of distances d between centers of gravity of neighboring elements of said group.

Taking into account this notion of preferred blocks, it may be said that the structure of the grating is preferably organized locally. The effect of this local organization, and in particular of the constant character of the width L, is transparency without diffusion in direct vision. A transparent substrate is defined as a substrate of which the properties in absorption are close to those of conventional glazing, an object seen through this substrate not appearing blurred.

The grating generally comprises a total of more than 100,000 elements and more generally more than 1,000,000 elements.

In a group of successive elements (50 or even preferably 20), the mean distance dm between neighboring elements is defined as the ratio of the sum of all the distances d between the centers of gravity of neighboring elements of a group and the number of distances between centers of gravity of neighboring elements of the group.

Variation of d within a group of 50 or preferably even 20 successive elements or even of any group of 50 or even of any group of 20 successive elements, may be greater than it is when passing once above dm and once below dm. In particular, when passing from one edge of the group to the other edge of the group, d may at least two times be greater and at least two times be less than the mean distance dm of the distances d within said group, the two times where d is greater than dm being separated by once where d is less than dm, and the two times where d is less than dm being separated by once where d is greater than dm. The frequency of this alternation may be even greater.

Within any group of 50 or preferably even 20 successive elements, d varies about dm of the group while deviating at least twice from dm by at least a value y, at least once while being above dm+y and at least once while being below dm−y. The value of y depends on the wave length region that it is desired to deflect. It may be said generally that it is at least 5% dm and more generally at least 10% dm.

The value d varies about dm while remaining generally within a range between dm+x and dm−x, the value of x depending on the wave length region that it is desired to deflect. Generally, x is at most 50% dm and more particularly at most 20% dm.

Whatever the group of 50 or preferably even 20 successive elements of the grating, the value dm for the group has a value of the order of the wavelength of the radiation that it is desired to deflect.

Let us recall that light radiations have substantially the following wavelengths:
Ultraviolet: 150 to 400 nm
Visible: 400 to 800 nm
Infrared: 800 nm to 100 μm Whatever the group of 50 or preferably even 20 successive elements, the value dm is chosen between ½ and twice the wavelength that it is desired to deflect. The value dm thus always lies between 75 nm and 200 μm. In general, whatever the group of 50 or preferably even 20 successive elements, dm lies between 100 nm and 20 μm.

If it is visible light that it is desired to deflect, dm is preferably chosen within the range 200 to 600 nm, preferably within the range 300 to 500 nm. In order to deflect visible light, dm is preferably greater than or equal to 200 nm and even greater than or equal to 300 nm. In order to deflect visible light, dm is preferably less than or equal to 600 nm and even less than 500 nm and in a still more preferred manner less than or equal to 450 nm. If dm is too high, in particular above 500 nm, the non-deflected transmitted light is less intense and, in addition, higher orders of the grating are made to appear, which means that the deflected light is less intense in several places.

Although it is not excluded that they are slanted, the elements are generally non-slanted (a person skilled in the art would say "blazed"), that is to say symmetrical in relation to the straight line perpendicular to the substrate and passing through the barycenter of the element.

If DM denotes the mean value of d for all the grating (not only 50 or 20 of its elements), as an example, the fluctuation of d when passing from one edge of the grating to the other, may be determined to follow a sinusoidal curve about the value DM. This fluctuation may however be random. In this case, the curve representing the distribution of d about DM is of the Gaussian curve type. In this case, there is no periodicity of the grating. The value DM is chosen to be within ½ and twice the wavelength that it is desired to deflect. The value DM thus always lies between 75 nm and 200 μm and generally between 100 nm and 20 μm. As has been seen, the elements are preferably grouped in blocks.

L is preferably constant or substantially constant for all the grating. However, L may vary about a mean value Lm, this variation being preferably less than 50% of Lm. The width L may thus vary between 0.5 Lm and 1.5 Lm. The more L varies within the grating, the more the latter loses in transparency in direct vision. Generally, the width Lm of elements is chosen within the range extending from 0.1 DM to 0.9 DM and preferably from 0.4 DM to 0.6 DM. The width L of an element is defined as being its width in the region of its barycenter. The elements are generally parallelepiped. In practice, since there is no perfection in this world, these parallelepipeds may have their corners (concave and convex) more or less rounded.

Generally, the depth of the elements is constant for all the grating. Generally, the ratio of the width L to the depth of elements is chosen within the range extending from 0.2 to 5 and preferably 0.4 to 2. Generally, the ratio of the width L to the depth of elements is constant for all the grating.

If a line is followed parallel to the substrate passing through the centers of gravity of the elements, one passes successively through the refractive index R1 of the elements and the refractive index R2 of the domains between elements. In particular, the elements may be of glass and the domains may be of air. In this case, protuberances in glass are produced as elements on the surface of a glass substrate. Air fills the space between the elements and naturally constitutes the domains. In this case, the index R1 is that of glass, for example 1.5, and the index R2 is that of air, that is to say 1. In this example, elements are produced in relief at the surface of a substrate. Passing from an element to a domain may however correspond to a change in refractive index that does not correspond to a portion in relief. In point of fact, it may consist of two different materials fitted one in the other so that the surface is smooth to touch. It is possible in particular to produce such an alternation of materials by ion exchange techniques or techniques based on a photorefractive and electro-optic effect.

In the same grating, all the elements generally have the same refractive index and all the domains generally have the same refractive index. The refractive indices of elements and domains may extend from 1 to 2.2. Generally, the elements may have their refractive index extending from 1.1 to 1.8. Generally, the domains may have their refractive index extended from 1 to 1.5.

The difference between the two refractive indices (those of elements and domains) may generally be between 0.02 and 1.5.

Generally, if the domains are air, the elements have a refractive index greater than that of domains.

Consisting essentially of equipping the glazing of buildings, the materials constituting said glazing will be chosen (substrate, and possibly a part added to said substrate) with satisfactory transparency.

The grating according to the invention serves in particular in a daylighting application. In this case, it is generally placed on a vertical item of glazing so that the lines of elements are horizontal. It is not excluded that the lines of elements are slanted. The grating generally occupies a height of at least 10 cm and more generally a height of at least 20 cm of the glazing, generally over all the width of the glazing.

The grating according to the invention may generally be produced by the following techniques: embossing, photolithography, transfer, ion exchange, photorefractive or electro-optical effect.

A first method comprises embossing a sol-gel layer or polymer added to a transparent sheet (substrate), and in particular made of glass. Embossing is a plastic or viscoplastic deformation produced by contact with a structured element, consisting of a roller for instance and on which a pressure is simultaneously applied. The sol-gel layers that can be used are generally liquid layers of an inorganic oxide precursor such as $SiO_2$, $Al_2O_3$, $TiO_2$ etc, for example dissolved in a water-alcohol mixture. These layers harden on drying with or without an auxiliary heating means. Mention may be made of an $SiO_2$ precursor tetraethoxysilane (TEOS) or methyltriethoxsilane (MTEOS). Organic functional groups may be included in these precursors and the silica finally obtained. As an example, fluorinated silanes have been described in EP 799 873 for obtaining a hydrophobic coating. The embossing may be carried out on polymer layers such as
polyethylene terephthalate (PET)
polystyrene,
polyacrylates such as polymethacrylate, polybutylacrylate, polymethacrylic acid, poly(2-hydroxyethyl methacrylate) and copolymers thereof,
polyepoxy (meth)acrylates,
polyurethane (meth)acrylates,
polyimides such as polymethylglutarimide,
polysiloxanes such as polyepoxysiloxanes,
polyvinyl ethers,
polybisbenzocyclobutenes etc.
alone or in copolymers or mixtures of several of these.

Embossing may be followed in some cases by etching. The embossed sol-gel or polymer layer may be attacked until the material of the subjacent transparent sheet reappears, first of all in deep parts of said elements in relief, and then progressively as far as their upper part. Thus the more or less irregular surface obtained at the end of etching may be formed entirely in the added sol-gel or polymer layer, or partly in this or partly in said transparent sheet, or furthermore entirely within the latter. The etching conditions should be regulated so that this surface that results has elements in relief with dimensions satisfying the definition of the device of the invention.

As etching methods, mention may be made of:
chemical etching, in particular by an acid,
Reactive Ion (Beam) Etching=RI (B) E),
plasma etching (Inductively Coupled Plasma=ICP).

It is to be noted that the embossing method permits rapid treatment to be carried out over vast areas, at a moderate cost.

Another possible method for producing the grating according to the invention comprises photolithography. This method generally consists of first of all providing the transparent substrate with a first layer in which said relief elements may be formed. This first layer is comparable to the added sol-gel or polymer layer of the embossing method. It may in addition be of the same nature as this, in particular in silica. In a second step of the method, a second layer of a photosensitive resin is deposited. This is hardened in defined localities, by exposure to targeted radiation. A mask is thus made, above the first layer to be etched, after removal of non-hardened parts of the photosensitive resin. Etching then takes place in a similar manner to that described above in relation to the optional step of the method by embossing. Any residues of the photosensitive resin may be removed.

Another method for producing the grating according to the invention comprises the transfer of a nanostructured layer. A layer adhered to a first support is adhered onto a second, so as to constitute a device according to the invention. The layer may be made of plastic or the like.

Another method that may be used is based on ion exchange, for example of $Na^+$ ions by $Ag^+$ ions in an inorganic glass.

Finally, a photorefractive effect may be used, in which modulated light induces a spatial modulation of the refractive index of the material (example: photorefractive crystal of barium titanate). Use may also be made of an electro-optical effect according to which an electrical field induces a spatial modification of the refractive index of the material.

The grating according to the invention serves in particular in daylighting applications. In this case, it is placed on vertical glazing, so that the line of elements are horizontal. The grating generally occupies a height of at least 10 cm and more generally a height of at least 20 cm of the glazing, generally over all the width of the glazing and in the upper part of the glazing.

The elements may be situated on the face of the glazing receiving incident light or on the face of the glazing where the light emerges (face turned toward the interior of the building).

FIG. 1 shows a substrate in section provided with a diffusing grating according to the invention. The substrate 1 comprises at its surface a multiplicity of parallel lines of elements $m_i$ with a rectangular section. The elements are thus linear and parallel in a direction perpendicular to FIG. 1 (this direction is generally horizontal when the window carrying the grating is positioned). These elements are thus parallelepipeds, of which FIG. 1 only shows sections. All the elements have the same geometry but the distance between neighboring elements varies. These elements have a refractive index R1. They are separated by air which thus constitutes the domains between elements. These air domains have a refractive index R2, generally around a value of 1. The dotted line 2 passes through the centers of gravity of all the elements. This line also passes alternately through the elements and through the air domains, and when passing from one edge of the grating to the other on this line, the refractive indices R1 and R2 are alternately passed through. The barycenter of an element is of course that of the material projecting from the substrate, that is to say coming as a protuberance from the substrate in relation to the line AA', that is to say the material over the depth p of the elements. As an example, the distance dl has been indicated between the elements m1 and m2. A group of 20 successive elements is shown, the mean of distances di between neighboring elements (mi and mi+1) of this group being indicated as being dm. When leaving from the upper edge of the group of 20 elements and passing in the direction of the other edge of the same group, d first of all passes below dm and then, when descending, d passes over dm and then passes again below and then passes again above, etc. The distance between centers of gravity of neighboring elements thus fluctuates about dm.

Figure 2:
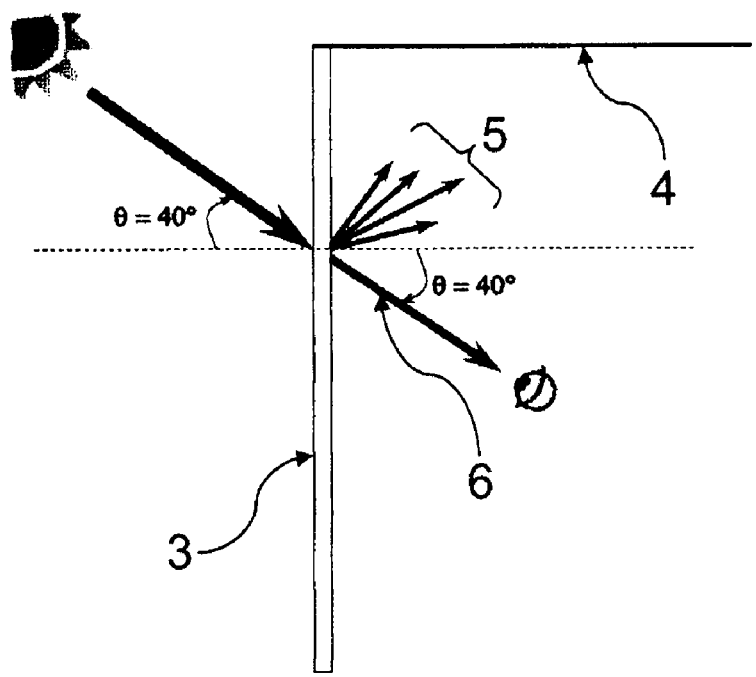

FIG. 2 illustrates the effect of the substrate 3 according to the invention on solar light passing through it. The transparent substrate 3 redirects a portion of the incident light in the desired direction (rays 5 in order 1 of FIG. 2), for example the ceiling 4. At the same time, it allows the rest of the incident light (rays 6 in order 0 of FIG. 2) to pass without deflecting or diffusing it. The redirected light 5 is diffused and does not include any pronounced apparent iridescence.

Figure 3:
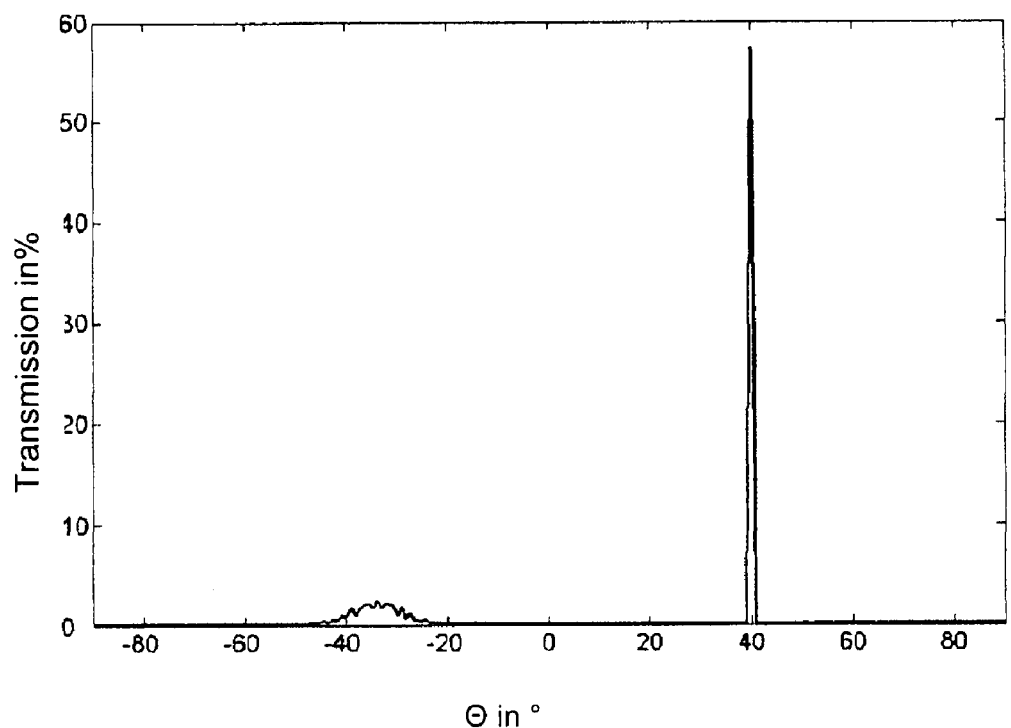

FIG. 3 shows the percentage of transmitted light as a function of the angle of emergence of the light according to the device of FIG. 2. It will be seen that transmission in order 1 about θ=−35° does not occur in a single direction, but over a wide range of angles varying from −45° to −20°. On the contrary, the light that is transmitted without being redirected (rays 6 of FIG. 2) is not diffused.

Transmission in order 0 occurs solely for an angle of θ=40°. The substrate provided with the grating according to the invention is thus transparent and non-diffusing in direct vision for an observer.

Figure 4:
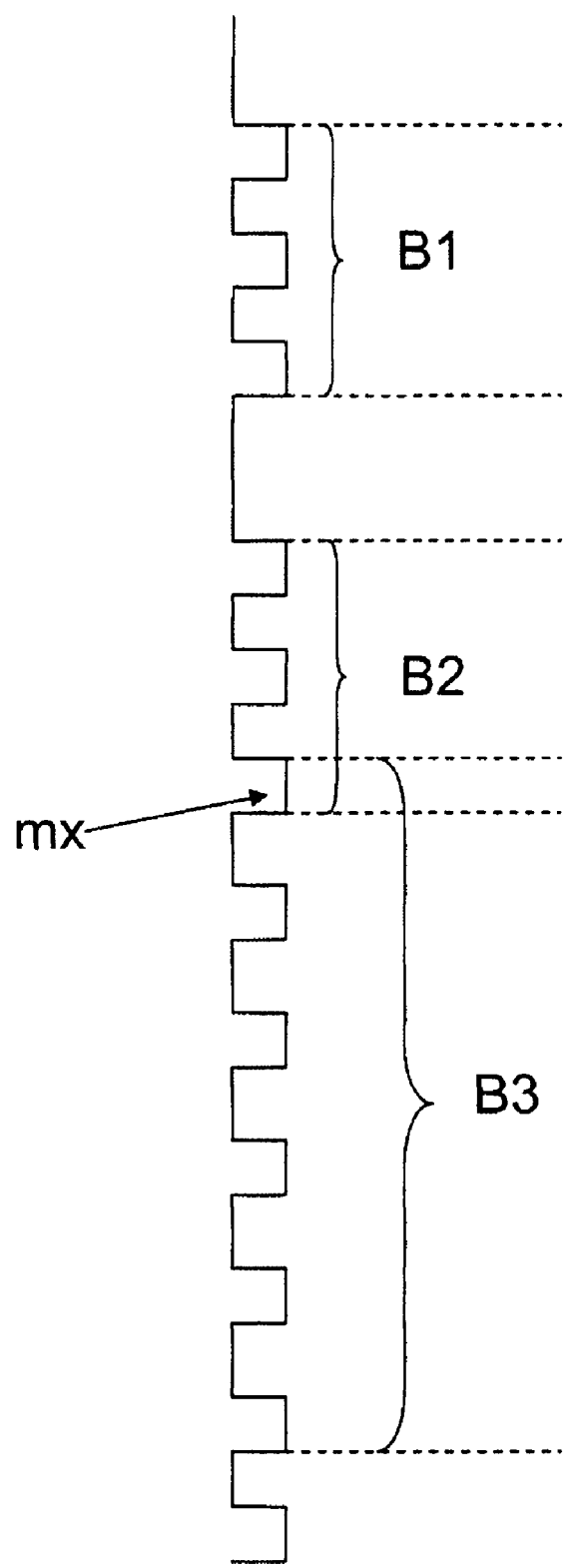

FIG. 4 illustrates the notion of a block. The block B1 contains 3 elements separated by two intervals. When leaving from inside block B1, the block is left as soon as the distance between elements becomes different (here greater). Block B2 is identical to block B1. Block B3 contains six elements and five intervals. The element mx is common to blocks B2 and B3.

EXAMPLE 1

Comparative

A 360 nm thick layer of silica is deposited by sol-gel over 50 cm situated at the upper part of an item of glazing of tradename "Planilux" marketed by Saint-Gobain Glass France. In a manner known to a person skilled in the art, a texture of linear elements in relief with a depth of 360 nm and width 200 nm is produced by embossing. The elements are perpendicular to the plane of the film. The separation between the centers of gravity of these elements passes progressively from 300 to 500 nm when passing from one edge of the grating to the other (that is while traveling over 50 cm of grating). The glazing is then placed as an external wall window. The glazing redirects the light coming from the outside toward the ceiling, but iridescence is perceived.

EXAMPLE 2

The procedure is as in example 1, except that the separation between the centers of gravity varies between 300 and 500 nm in a random manner over 50 cm of grating. No marked iridescence is observed.

The invention claimed is:

1. A substrate that is transparent in direct vision and deflects a light while diffusing the light, comprising at a surface a grating of lines of at least 200 elements separated by domains wherein a refractive index of the domains is different from the refractive index of the elements; a distance d between centers of gravity of neighboring elements varies in a non-monotonic manner from one edge of the grating to the other; for any group of 50 successive elements, the distance d between the centers of gravity of neighboring elements of said group is at least once greater than and at least once less than a mean distance dm of distances d between centers of gravity of neighboring elements of said group; and the dm is in a range of 75 nm to 200 μm.

2. The substrate according to claim 1, wherein for any group of 50 successive elements, the d deviates from the mean distance dm of distances d within said group at least once above dm+y and at least once below dm−y, wherein y is at least 5% of the dm.

3. The substrate according to claim 2, wherein y is at least 10% of the dm.

4. The substrate according to claim 1, wherein for any group of 50 successive elements, the d remains within dm+x and dm−x, wherein x is at most 50% of the dm.

5. The substrate according to claim 1, wherein for any group of 20 successive elements, the distance d between centers of gravity of neighboring elements of said group is at least once greater than and at least once less than the mean distance dm of distances d between centers of gravity of neighboring elements of said group, wherein the dm is in a range of 75 nm to 200 μm.

6. The substrate according to claim 5, wherein for any group of 20 successive elements, the d deviates from the mean distance dm of distances d within said group at least once above dm+y and at least once below dm−y, wherein y is at least 5% of the dm.

7. The substrate according to claim 6, wherein the y is at least 10% of the dm.

8. The substrate according to claim 1, wherein for any group of 20 successive elements, the d remains within dm+x and dm−x, wherein x is at most 50% of the dm.

9. The substrate according to claim 1, wherein DM represents the mean value of distances d between centers of gravity of neighboring elements for all the grating, and a mean width of elements extends from 0.1 DM to 0.9 DM.

10. The substrate according to claim 9, wherein all the elements of the grating have a width between 0.5 Lm and 1.5 Lm.

11. The substrate according to claim 1, wherein at least 80% of the elements of the grating form blocks, each block comprising 3 to 15 identical juxtaposed elements with a constant interval between elements.

12. The substrate according to claim 11, wherein at last 90% of the elements of the grating form blocks, each block comprising 3 to 15 identical juxtaposed elements with a constant interval between elements.

13. The substrate according to claim 11, wherein each block comprises 3 to 7 identical juxtaposed elements with a constant interval between elements.

14. A window comprising the substrate according to claim 11.

15. The substrate according to claim 1, wherein a ratio of a width L to a depth of the elements extends from 0.2 to 5.

16. The substrate according to claim 15, wherein the ratio of the width L to the depth of the elements extends from 0.4 to 2.

17. The substrate according to claim 1, wherein the refractive indices of elements and domains are within the range of 1 to 2.2.

18. The substrate according to claim 1, wherein the dm is less than 500 nm.

19. The substrate according to claim 1, wherein the dm is less than or equal to 450 nm.

20. The substrate according to claim 1, wherein the dm is greater than or equal to 200 nm.

21. The substrate according to claim 1, wherein the dm is greater than or equal to 300 nm.

22. The substrate according to claim 1, wherein a visible light having an angle of incidence greater than 30° is deflected and diffuse for 10 to 50% of the transmitted light, wherein the non-deflected light does not diffuse.

23. The substrate according to claim 1, wherein the elements are non-slanted.

24. A window comprising the substrate according to claim 1.

25. A building comprising the window according to claim 24, said window being vertical and exposed to solar light.

26. The building according to claim 25, wherein the building it is situated in a terrestrial latitude wherein solar rays form an angle of incidence with the horizontal greater than 30°, at least partially during the year.

27. A method of redirecting solar light from to a ceiling comprising installing the substrate of claim 1 in a building such that it redirects solar light to a ceiling.

* * * * *

UNITED STATES PATENT AND TRADEMARK OFFICE
CERTIFICATE OF CORRECTION

| | | |
|---|---|---|
| PATENT NO. | : 8,218,239 B2 | Page 1 of 1 |
| APPLICATION NO. | : 12/598603 | |
| DATED | : July 10, 2012 | |
| INVENTOR(S) | : Ludivine Menez et al. | |

It is certified that error appears in the above-identified patent and that said Letters Patent is hereby corrected as shown below:

Column 2, line 12, "order (redirected light)" should read --order 1 (redirected light)--.

Signed and Sealed this
Eleventh Day of September, 2012

David J. Kappos
*Director of the United States Patent and Trademark Office*